C. WAY.
SUBSOIL PLOW.
APPLICATION FILED MAY 29, 1915.
1,174,640.
Patented Mar. 7, 1916.
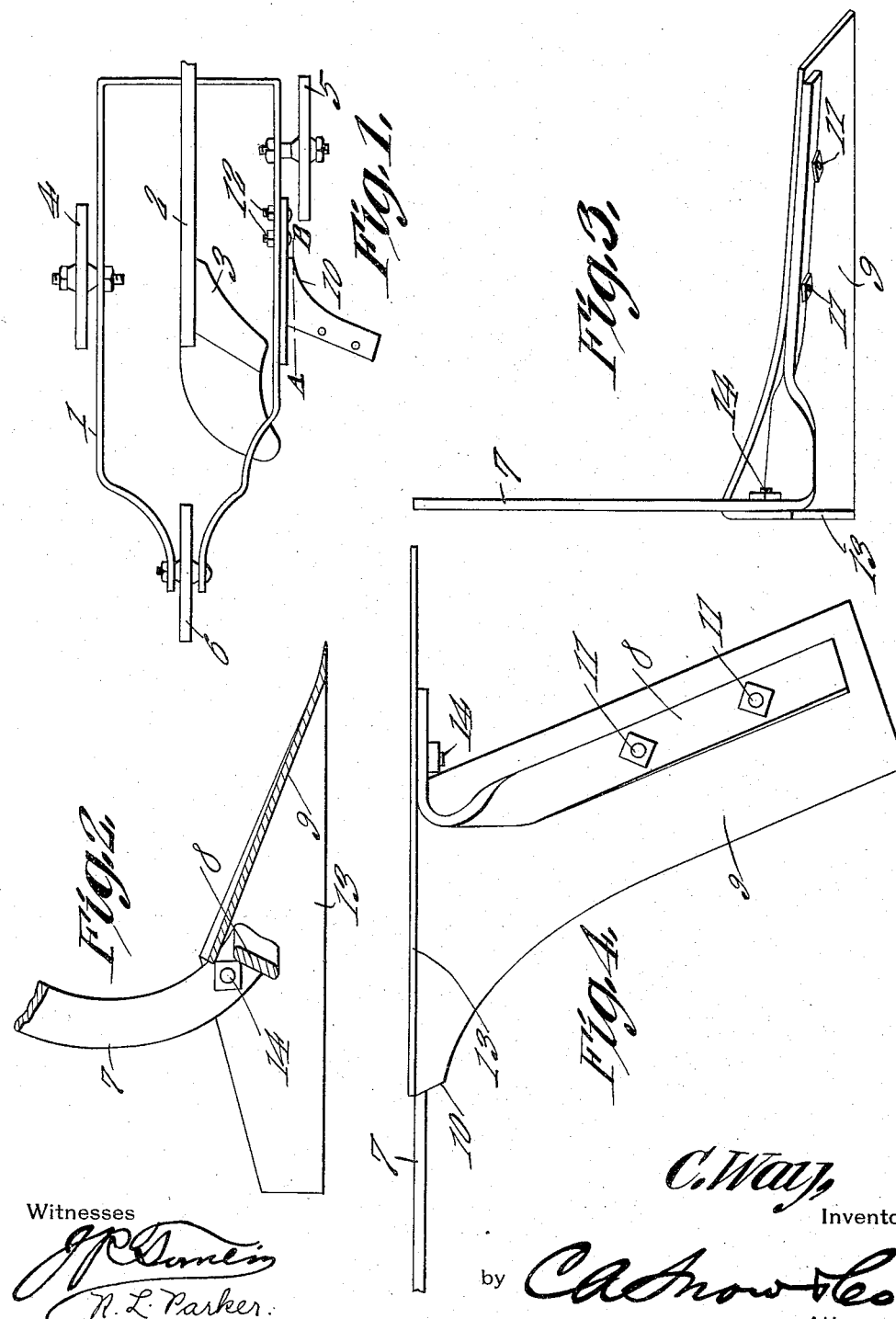

UNITED STATES PATENT OFFICE.

CHARLES WAY, OF EXIRA, IOWA.

SUBSOIL-PLOW.

1,174,640.  Specification of Letters Patent.  Patented Mar. 7, 1916.

Application filed May 29, 1915. Serial No. 31,218.

*To all whom it may concern:*

Be it known that I, CHARLES WAY, a citizen of the United States, residing at Exira, in the county of Audubon and State of Iowa, have invented a new and useful Subsoil-Plow, of which the following is a specification.

This invention relates to a subsoiler attachment for plows, one of the objects of the invention being to provide a device of this character adapted to travel within the furrow previously formed and to loosen the subsoil so that the furrow slice produced in the formation of the new furrow will be directed into the deepened furrow in which the subsoiler is moving, with the result that moisture is better retained or conserved.

A further object is to provide a subsoiler attachment which is simple in construction, durable and efficient, and which can be applied readily to the frame of a plow structure.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a plow having the present improvements combined therewith. Fig. 2 is an enlarged section on line A—B Fig. 1. Fig. 3 is an enlarged rear elevation of the subsoiler attachment. Fig. 4 is a bottom plan view thereof.

Referring to the figures by characters of reference 1 designates a frame carrying a plow beam 2 to which is connected a plow 3 of the usual form, this frame being provided with a ground wheel 4 at one side thereof, a furrow wheel 5 at the other side thereof, and another furrow wheel 6 at the rear end. The subsoiler constituting the principal part of the present invention is adapted to be secured to one side of the frame 1 so as to travel in the furrow in which the wheel 5 is located, thus to loosen the subsoil. The plow 3 is so positioned as to turn the furrow slice into the furrow in which the wheel 5 is located and onto the subsoil loosened by the subsoiler.

The subsoiler attachment includes a beam 7 formed of a metal bar, the lower end of the beam being provided with a laterally extending arm 8 integral therewith, this arm being given a one-quarter twist adjacent the beam so that a flat face of the arm 8 is thus presented to the bottom face of the share 9 of the subsoiler. This share has a forwardly extending point 10 such as ordinarily provided and the arm 8 is extended along the bottom of the share close to the rear edge thereof and is attached thereto by means of bolts 11 or the like. Beam 7 may be secured to frame 1 in any manner preferred, as by means of bolts 12 and when in position holds the subsoiler directly back of the wheel 5 and at a lower level than the plow 3.

When forming the first furrow in a field, the subsoiler is raised out of active position by detaching it from the frame 1. In producing the second furrow, however, the wheel 5 will travel in the furrow previously made, the wheel 6 traveling in the newly made furrow. The subsoiler will cut into the subsoil in the first furrow, thus increasing the depth of the furrow.

As shown particularly in Figs. 2, 3 and 4, the subsoiler is provided with a landslide 13 to which the standard 7 is secured, as at 14.

What is claimed is:—

1. A subsoiler including a standard, a laterally extending arm integral with the standard and a share secured upon the arm, said arm having a one-quarter twist to present a flat face to the share.

2. A subsoiler, including a standard, an arm integral with the rear end of the standard and extending laterally therefrom, said arm having a twist adjacent the standard, a share secured adjacent its rear edge upon the arm and having a forwardly extending point, and a landside connected to the standard.

In testimony that I claim the foregoing as my own, I have hereto affixed my signature in the presence of two witnesses.

CHARLES WAY.

Witnesses:
PETE HASSENFELDT,
LILLIAN V. DYER.

Copies of this patent may be obtained for five cents each, by addressing the "Commissioner of Patents, Washington, D. C."